(12) United States Patent
Taka et al.

(10) Patent No.: US 7,053,584 B2
(45) Date of Patent: May 30, 2006

(54) MOTOR DRIVING DEVICE

(75) Inventors: Hiroaki Taka, Kiryu (JP); Yoshifumi Kuwano, Kiryu (JP); Akio Takemori, Kiryu (JP); Yukinari Takahashi, Kiryu (JP)

(73) Assignee: Japan Servo.Co., Ltd., Tokyo (JP)

( * ) Notice: Subject to any disclaimer, the term of this patent is extended or adjusted under 35 U.S.C. 154(b) by 55 days.

(21) Appl. No.: 10/674,388

(22) Filed: Oct. 1, 2003

(65) Prior Publication Data
US 2004/0066164 A1 Apr. 8, 2004

(30) Foreign Application Priority Data
Oct. 3, 2002 (JP) ............................. 2002-290725

(51) Int. Cl.
*H02P 8/22* (2006.01)
*H02P 21/00* (2006.01)
*H02P 27/06* (2006.01)

(52) U.S. Cl. ..................... 318/685; 318/696; 318/432; 318/434

(58) Field of Classification Search ................ 318/685, 318/696, 700, 714, 720, 721, 722–724, 799–813
See application file for complete search history.

(56) References Cited

U.S. PATENT DOCUMENTS

| | | | | |
|---|---|---|---|---|
| 4,443,746 A | * | 4/1984 | Araki .......................... | 318/696 |
| 4,629,961 A | * | 12/1986 | Blaschke .................... | 318/803 |
| 4,634,949 A | | 1/1987 | Golladay | |
| 5,225,756 A | * | 7/1993 | Coutu .......................... | 318/696 |
| 5,309,353 A | * | 5/1994 | Schauder et al. ............. | 700/54 |
| 5,659,234 A | * | 8/1997 | Cresens ....................... | 318/696 |
| 5,668,459 A | * | 9/1997 | Kim ............................. | 318/798 |
| 5,903,129 A | * | 5/1999 | Okuno et al. ................ | 318/721 |
| 5,963,007 A | * | 10/1999 | Toyozawa et al. ........... | 318/799 |
| 6,075,337 A | * | 6/2000 | Ishii et al. ................... | 318/801 |
| 6,259,226 B1 | * | 7/2001 | Kaitani et al. ............... | 318/798 |
| 6,320,349 B1 | * | 11/2001 | Kaneko et al. .............. | 318/798 |
| 6,377,017 B1 | * | 4/2002 | Kondou et al. .............. | 318/727 |
| 6,377,018 B1 | * | 4/2002 | Tajima et al. ................ | 318/727 |
| 6,747,433 B1 | * | 6/2004 | Kuwano et al. ............. | 318/685 |
| 6,850,027 B1 | * | 2/2005 | Kuwano et al. ............. | 318/685 |

FOREIGN PATENT DOCUMENTS

| | | |
|---|---|---|
| JP | 62126891 | 6/1987 |
| JP | 11164598 | 6/1999 |
| WO | 0 666 643 A1 | 8/1995 |

* cited by examiner

*Primary Examiner*—Marlon T. Fletcher
*Assistant Examiner*—Eduardo Colon Santana
(74) *Attorney, Agent, or Firm*—Birch Stewart Kolasch & Birch LLP

(57) ABSTRACT

Disclosed is a driving device for a motor such as a stepping motor etc. for controlling an angle and a speed of the motor, wherein the driving device comprises exciting current detectors for detecting exciting currents of motor windings of the motor, an exciting current amplitude computation means for computing an exciting current amplitude value or the square of the exciting current amplitude value from exciting current detection values detected by the exciting current detectors, and a voltage impression unit for impressing voltages at values corresponding to a deviation value of the exciting current amplitude value and the current amplitude command or a deviation value of the square of the exciting current amplitude value and the square of the current amplitude command to the motor windings.

9 Claims, 2 Drawing Sheets

MOTOR DRIVING DEVICE

This nonprovisional application claims priority under 35 U.S.C. § 119(a) on patent application Ser. No(s). 2002-290725 filed in JAPAN on Oct. 3, 2002, which is(are) herein incorporated by reference.

BACKGROUND OF THE INVENTION

1. Field of the Invention

The invention relates to a driving device for a motor such as a stepping motor, and so forth, for controlling an angle and a speed of the motor.

2. Description of the Related Art

Following enhancement in performance of equipment driven by a stepping motor, the stepping motor is required to be rotatable in a wider range with low vibration, however, since the stepping motor is rotated by changing over energizing conditions of respective motor windings every time a command pulse given from outside is impressed, there arise problems of occurrence of vibration and step out, accompanying changeover of the energizing conditions.

With the stepping motor described above, there has been generally adopted micro-step driving whereby exciting currents of the motor windings are caused to change smoothly by use of a PWM inverter of a pulse width modulation mode (PWM mode) as means for reducing vibration. That is, a micro-step function is provided by the PWM inverter whereby the motor windings are energized with motor winding currents varying in the form of a sine wave every time an external command pulse is impressed to subdivide a fundamental step angle, thereby rotating a rotor step by step every time the external command pulse is impressed.

With a conventional motor driving device for a two-phase stepping motor using the PWM inverter described above, by inputting an angle command $\theta^*$, an $\alpha$-phase current command $i_\alpha^*$, and a $\beta$-phase current command $i_\beta^*$, there are found deviation between $i_\alpha^* \sin \theta^*$ and an exciting current $i_{\alpha f}$ of an $\alpha$-phase motor winding, and deviation between $i_\beta^* \cos \theta^*$ and an exciting current $i_{\beta f}$ of a $\beta$-phase motor winding, and voltages proportional to the deviations, respectively, are impressed to the respective motor windings. Thus, in order to feed the exciting currents in accordance with the $\alpha$-phase current command $i_\alpha^*$, and the $\beta$-phase current command $i_\beta^*$, respectively, the voltages impressed to the $\alpha$-phase and $\beta$-phase motor windings are controlled by current control systems independent from each other.

In the case of such conventional techniques as described, since there exist a plurality of the current control systems independent from each other, there has been the need for installing the current control systems in the same number as the number of phases according as the phases of a stepping motor is increased, causing a problem of complexity in configuration.

SUMMARY OF THE INVENTION

It is therefore an object of the invention to provide a motor driving device, simple in configuration.

With the invention, there is provided a motor driving device, comprising exciting current detectors for detecting exciting currents of motor windings of a motor, an exciting current amplitude computation means for computing an exciting current amplitude value or the square of the exciting current amplitude value from an exciting current detection values detected by the exciting current detectors, and a voltage impression unit for impressing voltages at a values corresponding to the exciting current amplitude value or the square of the exciting current amplitude value to the motor windings.

With the motor driving device, according to the invention, the voltages at the values corresponding to the exciting current amplitude value or the square of the exciting current amplitude value is impressed to the motor windings, so that there can be provided a motor driving device, simple in configuration.

DETAILED DESCRIPTION OF THE PREFERRED EMBBODMENTS

Figure 1:
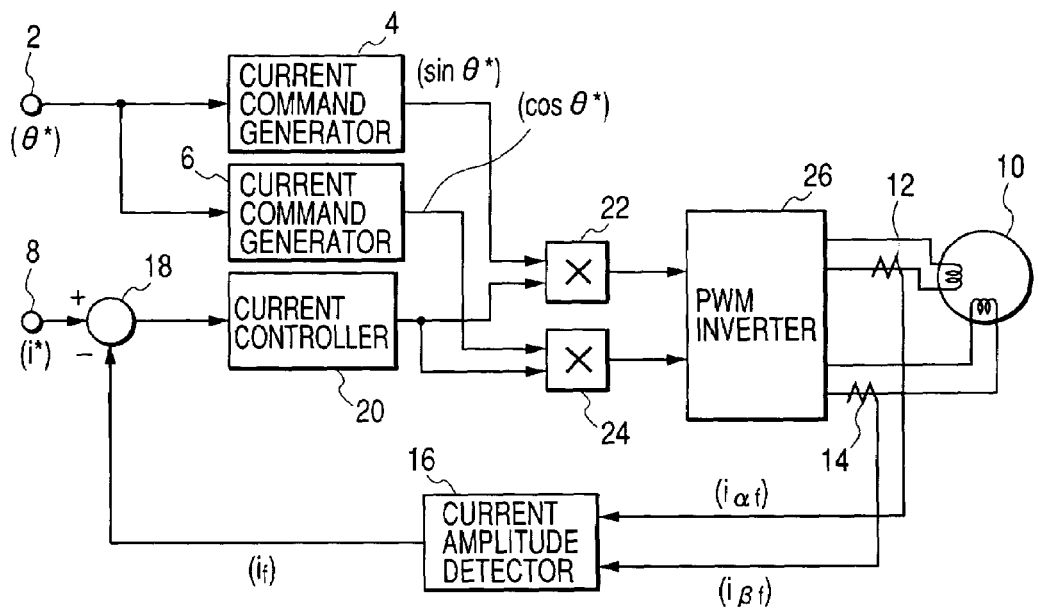
FIG. 1 is a block diagram of an embodiment of a motor driving device for a stepping motor according to the invention.

An embodiment of a motor driving device for a stepping motor according to the invention is described hereinafter with reference to FIG. 1. In FIG. 1, a stepping motor 10 has two motor windings, that is, an $\alpha$-phase motor winding and a $\beta$-phase motor winding, and an $\alpha$-phase exciting current detector 12 detects an exciting current of the $\alpha$-phase motor winding of the stepping motor 10 while a $\beta$-phase exciting current detector 14 detects an exciting current of the $\beta$-phase motor winding of the stepping motor 10. An exciting current amplitude detector 16 receives an $\alpha$-phase exciting current detection value $i_{\alpha f}$ outputted from the $\alpha$-phase exciting current detector 12, and a $\beta$-phase exciting current detection value $i_{\beta f}$ outputted from the $\beta$-phase exciting current detector 14, whereupon the square root of the sum of the square of the $\alpha$-phase exciting current detection value $i_{\alpha f}$ and the square of the $\beta$-phase exciting current detection value $i_{\beta f}$ is computed to thereby output an exciting current amplitude value $i_f$ of the stepping motor 10.

A current amplitude deviation detector 18 receives a current amplitude command $i^*$ given from a current amplitude command input terminal 8 and the exciting current amplitude value $i_f$, whereupon there is outputted a current amplitude deviation value representing a difference between the current amplitude command $i^*$ and the exciting current amplitude value $i_f$. A current controller 20 receives the current amplitude deviation value to thereby amplify the same.

Meanwhile, an angle command $\theta^*$ given from an angle command input terminal 2 enters a current command generator 4 having a function of generating sine wave signals and a current command generator 6 having a function of generating cosine wave signals, respectively, whereupon the current command generator 4 outputs an $\alpha$-phase current command $\sin \theta^*$ and the current command generator 6 outputs a $\beta$-phase current command $\cos \theta^*$. Multipliers 22, 24 carry out multiplication of an output of the current controller 20 by the $\alpha$-phase current command $\sin \theta^*$, and by the $\beta$-phase current command $\cos \theta^*$, respectively. A PWM inverter 26 feeds motor winding currents varying in the form of a sine wave every time an external command pulse is impressed, whereupon voltages proportional to outputs of the multipliers 22, 24, respectively, are impressed the stepping motor 10 as an α-phase motor winding voltage and a β-phase motor-winding voltage thereof, respectively.

The α-phase exciting current detector 12 and the β-phase exciting current detector 14 make up exciting current detectors for detecting exciting currents of the motor windings. The exciting current amplitude detector 16 makes up an exciting current amplitude computation means for computing the exciting current amplitude value from the exciting current detection values. The current amplitude deviation detector 18 makes up a current amplitude deviation detection means for computing the current amplitude deviation value. The current command generator 4 and the current command generator 6 make up current command computation means for computing current command in the form of a sine wave signal and a current command in the form of a cosine wave signal on the basis of the angle command given from outside. The multipliers 22, 24 make up multiplication means for multiplying values corresponding to the current amplitude deviation value by the current commands. The PWM inverter 26 makes up a voltage impression unit for impressing voltages at values corresponding to the exciting current amplitude value to the motor windings.

The motor driving device for the stepping motor according to the present embodiment of the invention has a micro-step function of subdividing a fundamental step angle because the PWM inverter 26 feeds the motor winding currents varying in the form of the sine wave every time the external command pulse is impressed, thereby rotating a rotor step by step every time the external command pulse is impressed. Further, since this is a case of two-phase AC having an α-phase exciting current and a β-phase exciting current with a phase difference by 90° therebetween, the exciting current amplitude value $i_f$ can be obtained by finding the square root of the sum of the square of the α-phase exciting current detection value $i_{\alpha f}$ and the square of the β-phase exciting current detection value $i_{\beta f}$. Then, since the current amplitude command i* and the exciting current amplitude value $i_f$, enter the current amplitude deviation detector 18, and the current amplitude deviation value sent out from the current amplitude deviation detector 18 enters the current controller 20, micro-step driving of the stepping motor 10 can be implemented by use of one unit of the current amplitude deviation detector 18 and the current controller 20. That is, it is possible to effect the micro-step driving of a multiphase stepping motor by use of one unit of a current amplitude deviation detector regardless of the number of phases. Accordingly, it is possible to provide a driving device for a stepping motor, simple in configuration, so that a cost of the motor driving device can be reduced, and further, since the number of elements to be controlled can be reduced, fluctuation in exciting current amplitude can be decreased. Furthermore, the voltages proportional to values obtained by multiplying a value corresponding to the current amplitude deviation value by the α-phase current command sin θ*, and the α-phase current command cos θ*, respectively, are impressed to the α-phase motor winding and β-phase motor winding of the stepping motor 10, respectively, so that current command amplitude for the a-phase and the β-phase, respectively, can be rendered to be at an identical value.

Figure 2:
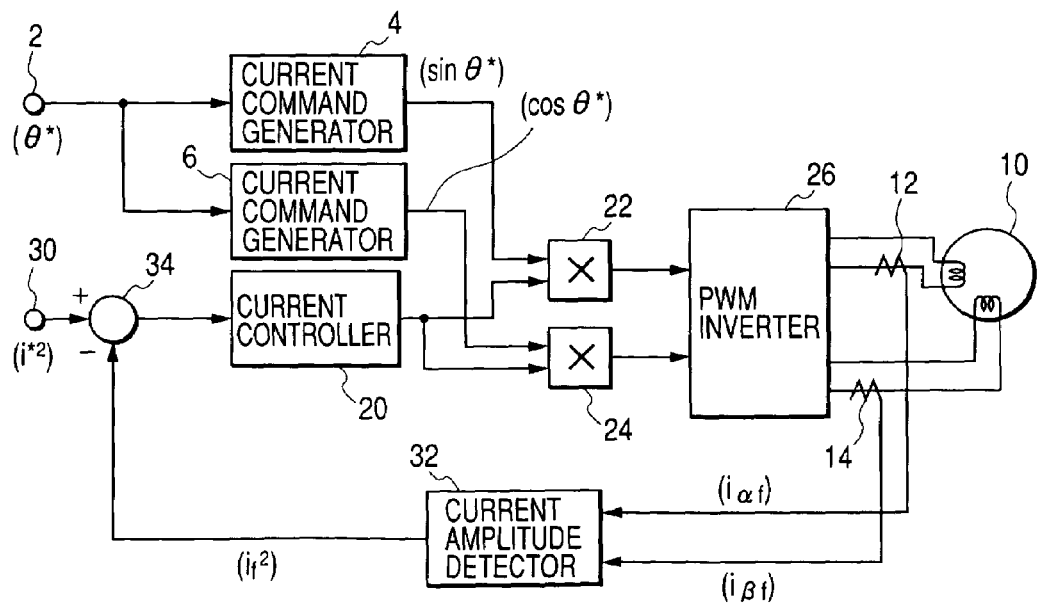
FIG. 2 is a block diagram of another embodiment of a motor driving device for a stepping motor according to the invention.

Another embodiment of a motor driving device for a stepping motor according to the invention is described hereinafter with reference to FIG. 2. An exciting current amplitude detector 32 receives an a-phase exciting current detection value $i_{\alpha f}$ and a β-phase exciting current detection value $i_{\beta f}$, whereupon the sum of the square of the a-phase exciting current detection value $i_{\alpha f}$ and the square of the β-phase exciting current detection value $i_{\beta f}$ is computed to thereby output the square of an exciting current amplitude value $i_f^2$ of the stepping motor 10. A current amplitude deviation detector 34 receives the square of a current amplitude command i*² given from a current amplitude command input terminal 30, and the square of the exciting current amplitude value $i_f^2$ whereupon there is outputted a current amplitude square deviation value, representing a difference between the square of the current amplitude command i*² and the square of the exciting current amplitude value $i_f^2$. A current controller 20 receives the current amplitude square deviation value to thereby amplify the same. Multipliers 22, 24 carry out multiplication of an output of the current controller 20 by the α-phase current command sin θ*, and by the β-phase current command cos θ*, respectively. A PWM inverter 26 impresses voltages proportional to outputs of the multipliers 22, 24, respectively, to the stepping motor 10 as an α-phase motor winding voltage and a β-phase motor winding voltage thereof, respectively.

The exciting current amplitude detector 32 makes up an exciting current amplitude computation means for computing the square of the exciting current amplitude value from the exciting current detection values. The current amplitude deviation detector 34 makes up a current amplitude deviation detection means for computing the current amplitude square deviation value. The PWM inverter 26 makes up a voltage impression unit for impressing voltages at values corresponding to a deviation value of the square of the exciting current amplitude value and the square of the current amplitude command to the motor windings.

With the present embodiment of the motor driving device for the stepping motor according to the invention, since the square of the current amplitude command i*², and the square of the exciting current amplitude value $i_f^2$ enter the current amplitude deviation detector 34, and voltages proportional to values corresponding to the current amplitude square deviation value delivered from the current amplitude deviation detector 34 are impressed to the α-phase motor winding of the stepping motor 10 and the β-phase motor winding thereof, respectively, there is no need for finding square roots, so that computation can be simplified, thereby enabling a configuration of the device to be further simplified. Furthermore, when using a microcomputer in computation, computation time can be shortened.

Figure 3:
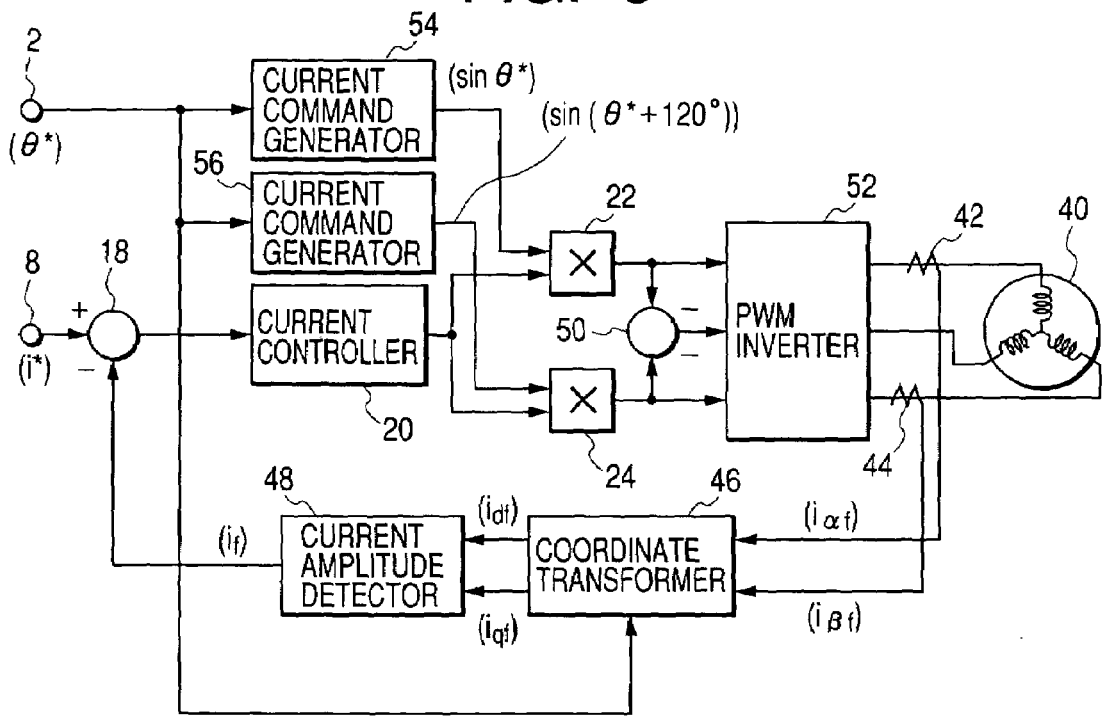
FIG. 3 is a block diagram of still another embodiment of a motor driving device for a stepping motor according to the invention.

Still another embodiment of a motor driving device for a stepping motor according to the invention is described hereinafter with reference to FIG. 3. In FIG. 3, an α-phase exciting current detector 42 detects an exciting current of an α-phase motor-winding of a three-phase stepping motor 40 while a β-phase exciting current detector 44 detects an exciting current of a β-phase motor-winding of the stepping motor 40. A d/q rotational coordinate transformer 46 receives an α-phase exciting current detection value $i_{\alpha f}$ outputted from the α-phase exciting current detector 42, and a β-phase exciting current detection value $i_{\beta f}$ outputted from the β-phase exciting current detector 44, thereby transforming the exciting current detection values $i_{\alpha f}$, $i_{\beta f}$ into transformed exciting current values $i_{df}$, $i_{qf}$ of d/q axes coordinate orthogonal to each other, respectively. An exciting current amplitude detector 48 receives the transformed exciting current values $i_{df}$, $i_{qf}$, whereupon the square root of the sum of the squares of the transformed exciting current values $i_{df}$, $i_{qf}$ is computed to thereby output an exciting current amplitude value $i_f$ of the stepping motor 40. A current amplitude deviation detector 18 receives a current amplitude command i* and the exciting current amplitude value $i_f$, whereupon there is outputted a current amplitude deviation value. A current controller 20 receives the current amplitude deviation value to thereby amplify the same. Meanwhile, an angle command θ* given from an angle command input terminal 2 is delivered to current command generators 54, 56, having a function of generating sine wave signals, respectively, whereupon the current command generator 54 outputs a current command sin θ* and the current command generator 56 outputs a current command sin(θ*+120°). Multipliers 22, 24 carry out multiplication of an output of the current controller 20 by the current commands sin θ*, and sin(θ*+120°), respectively. An adder 50 adds up negative values of outputs of the multipliers 22, 24, respectively, to thereby find a value proportional to a current command sin(θ*+240°). A PWM inverter 52 impresses voltages proportional to values obtained by multiplying an output of the multipliers 22, 24, and the adder 50, that is, a value corresponding to the current amplitude deviation value, by the current commands sin θ*, sin(θ*+120°), and sin(θ*+240°), respectively, to the stepping motor 40 as respective motor winding voltages thereof.

The d-q rotational coordinate transformer 46 and the exciting current amplitude detector 48 make up an exciting current amplitude computation means for computing the exciting current amplitude value by executing coordinate transformation of the two exciting current detection values to find the two transformed exciting current values, thereby finding the square root of the sum of the squares of the transformed exciting current values. The current command generators 54, 56 make up current command computation means for computing the current commands in the form of a sine wave signal on the basis of angle command. The PWM inverter 52 makes up a voltage impression unit for impressing voltages at values corresponding to the exciting current amplitude values to the motor windings.

With the motor driving device for the stepping motor according to the present embodiment of the invention, an a phase exciting current and a β-phase exciting current are not two-phase AC with a phase difference by 90° therebetween, but transformed exciting currents of the d/q axes coordinate are two-phase AC with a phase difference by 90° therebetween, so that the exciting current amplitude value $i_f$ can be obtained by finding the square root of the sum of the squares of the transformed exciting current values $i_{df}$, $i_{qf}$, respectively. Accordingly, the motor driving device for the three-phase stepping motor 40 can be rendered as simple in configuration as the driving device for the two-phase stepping motor 10.

Further, by altering computation contents of the coordinate transformer, and input commands to the PWM inverter 52 so as to correspond to the number of phases, the motor driving device according to the present embodiment can similarly cope with a multi-phases stepping motor other than the three-phase stepping motor, regardless of the number of the phases.

Figure 4:
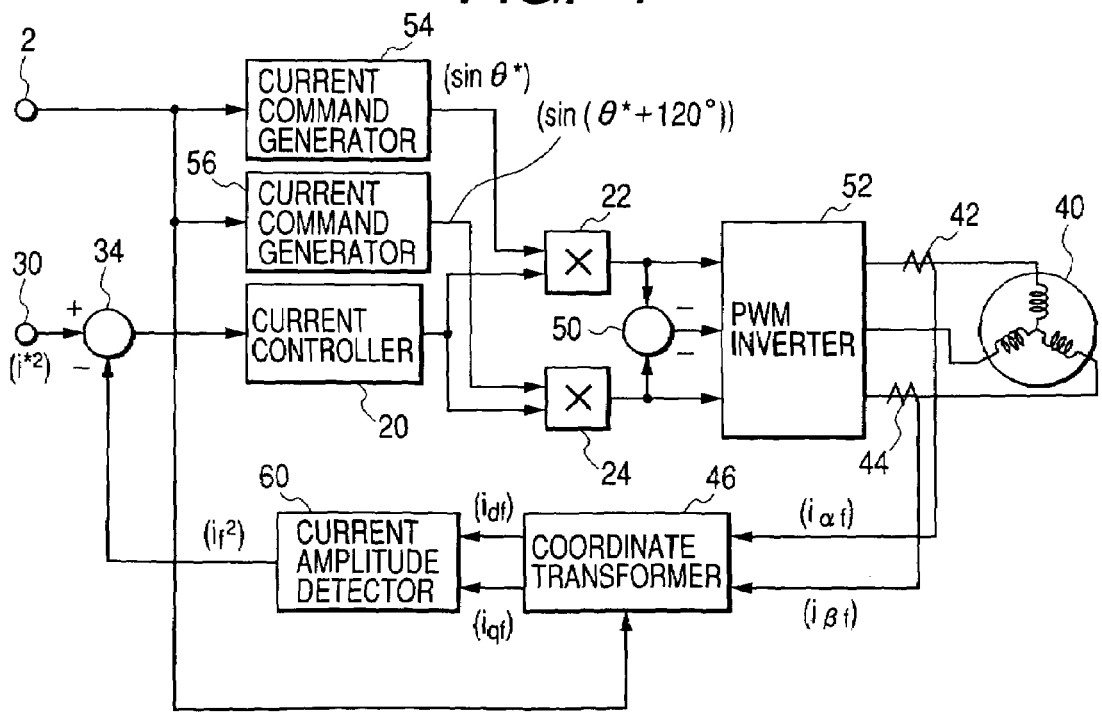
FIG. 4 is a block diagram of a further embodiment of a motor driving device for a stepping motor according to the invention.

A further embodiment of a motor driving device for a stepping motor according to the invention is described hereinafter with reference to FIG. 4. In FIG. 4, an exciting current amplitude detector 60 receives transformed exciting current values $i_{df}$, $i_{qf}$, whereupon the sum of the squares of the transformed exciting current values $i_{df}$, $i_{qf}$ is computed to thereby output the square of an exciting current amplitude value, $i_f^2$, of the stepping motor 40. A current amplitude deviation detector 34 receives the square of a current amplitude command $i^{*2}$ and the square of the exciting current amplitude value $i_f^2$, whereupon there is outputted a current amplitude square deviation value. A current controller 20 receives the current amplitude square deviation value to thereby amplify the same. Multipliers 22, 24 carry out multiplication of an output of the current controller 20 by current commands sin θ*, and sin(θ*+120°), respectively. An adder 50 adds up negative values of outputs of the multipliers 22, 24, respectively. A PWM inverter 52 impresses voltages proportional to values obtained by multiplying outputs of the multipliers 22, 24, and the adder 50, that is, a value corresponding to the current amplitude square deviation value, by the current commands sin θ*, sin(θ*+120°), and a current command sin(θ*+240°), respectively, to the stepping motor 40 as respective motor winding voltages thereof.

The d/q rotational coordinates transformer 46 and the exciting current amplitude detector 60 make up an exciting current amplitude computation means for computing the square of the exciting current amplitude value by executing coordinate transformation of the two exciting current detection values to find the two transformed exciting current values, thereby finding the sum of the squares of the transformed exciting current values. The PWM inverter 52 makes up a voltage impression unit for impressing voltages at values corresponding to a deviation value of the square of the exciting current amplitude value and the square of the current amplitude command to the motor windings.

Furthermore, the invention is applicable to a motor driving device for a brushless motor by providing a motor with a magnetic polarity detector and using an output signal of the magnetic polarity detector as an excitation changeover signal corresponding to an external command pulse.

In addition, a microcomputer may be used for the exciting current amplitude computation means, current amplitude deviation detection means, current command computation means, and multiplication means.

What is claimed is:

1. A motor driving device, comprising:

exciting current detectors for detecting exciting currents of motor windings of a motor;

an exciting current amplitude computation means for computing the square of an exciting current amplitude value from exciting current detection values detected by said exciting current detectors; and a voltage impression unit for impressing voltages at values corresponding to the square of said exciting current amplitude value to the motor windings;

a current amplitude deviation detection means for computing a current amplitude square deviation value representing a difference between a square of a current amplitude command given from outside and a square of said exciting current amplitude value;

current command computation means for computing current commands in the form of at least one of sine wave signal and cosine wave signal on the basis of an angle command given from outside; and multiplication means for multiplying values corresponding to said current amplitude square deviation value by said current commands, wherein said voltage impression unit impresses voltages, corresponding to outputs of said multiplication means, to said motor windings; and wherein said motor is a stepping motor, and said voltage impression unit feeds motor winding currents varying in the form of a sine wave every time an external command pulse is impressed.

2. The motor driving device, according to claim 1, wherein said motor winding currents are fed by a PWM inverter.

3. The motor driving device, according to claim 1, wherein said motor is a two-phase stepping motor, and said current command computation means compute said current command in the form of a sine wave signal and said current command in the form of a cosine wave signal on the basis of said angle command.

4. The motor driving device, according to claim 1, wherein said motor is a stepping motor with not less than three phases, and said current command computation means compute said current commands in the form of the sine wave signal on the basis of said angle command.

5. A motor driving device, comprising:
exciting current detectors for detecting exciting currents of motor windings of a motor;
an exciting current amplitude computation means for computing the square of said an exciting current amplitude value from exciting current detection values detected by said exciting current detectors; and
a voltage impression unit for impressing voltages at values corresponding to the square of said exciting current amplitude value to the motor windings;
a current amplitude deviation detection means for computing a current amplitude square deviation value representing a difference between the square of a current amplitude command given from outside and the square of said exciting current amplitude value;
current command computation means for computing current commands in the form of at least one of sine wave signal and cosine wave signal on the basis of an angle command given from outside; and
multiplication means for multiplying values corresponding to said current amplitude square deviation value by said current commands,
wherein said voltage impression unit impresses voltages, corresponding to outputs of said multiplication means, to said motor windings.

6. The motor driving device, according to claim 5, wherein said motor is a two-phase stepping motor, and said current command computation means compute said current command in the form of said sine wave signal and said current command in the form of said cosine wave signal on the basis of said angle command.

7. The motor driving device, according to claim 5, wherein said motor is a stepping motor with not less than three phases, and said current command computation means compute said current commands in the form of said sine wave signal on the basis of said angle command.

8. The motor driving device according to claim 5, wherein said motor is a two-phase stepping motor, said exciting current detectors detect said exciting currents of said motor windings for two phases, respectively, and said exciting current amplitude computation means finds the sum of the squares of said exciting current detection values for said two phases, thereby computing the square of said exciting current amplitude value.

9. The motor driving device according to claim 5, wherein said motor is a stepping motor with not less than three phases, said exciting current detectors detect said exciting currents of said motor windings for two phases, respectively, and said exciting current amplitude computation means executes coordinate transformation of said exciting current detection values for said two phases to find two transformed exciting current values, whereupon the sum of the squares of said two transformed exciting current values is found, thereby computing the square of said exciting current amplitude value.

* * * * *